No. 728,562. PATENTED MAY 19, 1903.
S. J. GALLOWAY.
SAW FILING GAGE.
APPLICATION FILED JULY 2, 1902.
NO MODEL.

WITNESSES:
John B...
Isaac B. Owens.

INVENTOR
Samuel J. Galloway
BY
ATTORNEYS.

No. 728,562.

Patented May 19, 1903.

UNITED STATES PATENT OFFICE.

SAMUEL JAY GALLOWAY, OF HILLSBORO, OREGON.

SAW-FILING GAGE.

SPECIFICATION forming part of Letters Patent No. 728,562, dated May 19, 1903.

Application filed July 2, 1902. Serial No. 114,044. (No model.)

*To all whom it may concern:*

Be it known that I, SAMUEL JAY GALLOWAY, a citizen of the United States, and a resident of Hillsboro, in the county of Washington and State of Oregon, have invented a new and Improved Saw-Filing Gage, of which the following is a full, clear, and exact description.

This invention relates to a device for gaging the action of a file on saws, particularly crosscut-saws which have alternate cutting and drag teeth.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
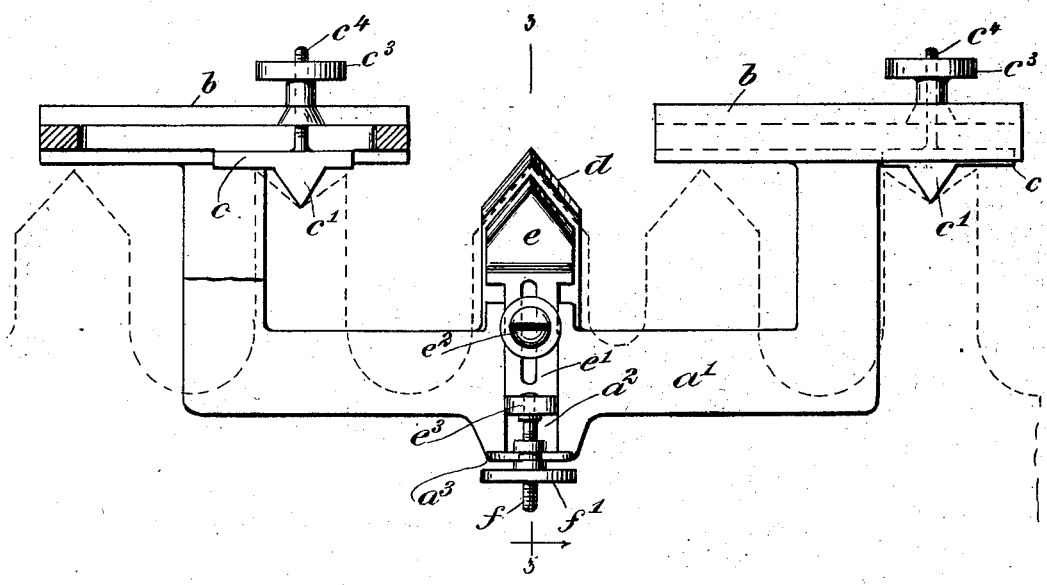
Figure 2:
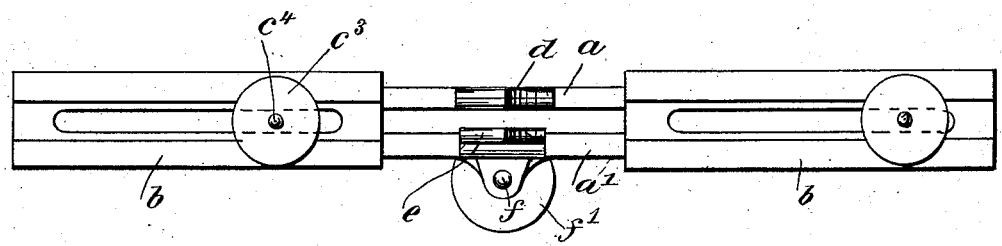
Figure 3:
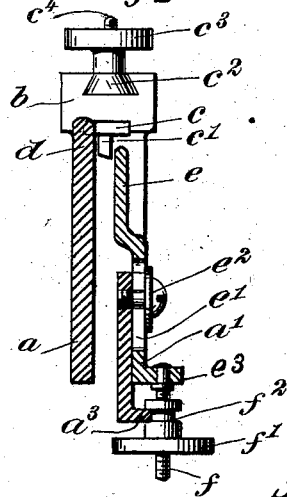

Figure 1 is a side elevation of the gage with parts in section and indicating a saw by dotted lines. Fig. 2 is a plan view, and Fig. 3 is a cross-section on the line 3 3 of Fig. 1.

The device comprises a double U-shaped frame formed with the two parts $a$ and $a'$, as shown, this frame being adapted to straddle the saw and extend lengthwise thereof. At each end of the frame is a horizontally-located guide $b$, which is grooved in its bottom to receive a slide $c$, having a point $c'$, and which is undercut in its top to receive the correspondingly-formed shank $c^2$ of a thumb-nut $c^3$. The slide $c$ has a screw $c^4$, this screw projecting up through the longitudinal slot in the guide $b$ and being engaged by the thumb-nut $c^3$. By means of these devices the slide $c$ may be moved to and held at any desired position as to the guide. The point $c'$ is adapted to bear in the notch in the drag-tooth of the saw, as indicated in Fig. 1, to prevent longitudinal movement of the gage. The slides bear on the drag-teeth of the saw and support the gage in position. By adjusting the slides the gage may be fitted to a saw of any size.

On the side $a$ of the U-shaped frame at the middle thereof is a gage-plate $d$, which is preferably formed integral with the frame and projected upward, said gage-plate terminating in a hardened-steel double-beveled and rounding point, as indicated in Fig. 1.

On the side $a'$ of the frame, directly opposite the gage-plate $d$, is a gage-plate $e$, which is preferably formed of hardened steel and has a longitudinally-slotted shank $e'$, through which is passed a screw or pin $e^2$, serving to hold the gage-plate $e$, so that it may be adjusted vertically. The point of the gage $e$ is double-beveled and rounding, the same as the plate $d$. The shank $e'$ lies in a groove $a^2$, formed in the side $a'$ of the frame, and the lower end of the shank is turned outward, as indicated at $e^3$, and carries a screw $f$, on which works a thumb-nut $f'$. This thumb-nut has a hub $f^2$, with an annular groove therein, and in said groove is fitted loosely a lip $a^3$, formed on or fastened to the part $a'$ of the frame. By turning the screw $f'$ the gage-plate $e$ may be readily adjusted through the action of the parts $f$ and $e'$.

In the use of the device the frame is fitted over the saw, with one frame part on each side, and the slides $c$ are adjusted so that their points $c'$ will bear accurately on two drag-teeth, so as to position the gage-plates $d$ and $e$ properly with respect to the cutting-tooth to be filed, all of which is shown in Fig. 1. The gage-plate $e$ is then adjusted so as to lie at the proper inclination with respect to the gage-plate $d$, and then the filing may be effected by running the file over the tooth and against the gage-plates. After the first tooth has been filed the gage should be readjusted so as to cover the next tooth, and thus the work may be carried on until the saw has been entirely filed.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A saw-filing gage, comprising a frame, a guide rigidly connected therewith, said guide having a longitudinal slot and an undercut groove, a slide having a point for the purpose specified, a screw attached to the slide and projected through a slot in the guide, a thumb-nut working on the screw and having a beveled stem fitting in the said undercut groove in the guide, and a gage proper carried by the frame.

2. A saw-filing gage, comprising a frame formed in two parts adapted to straddle the saw, a gage-plate on each part of the frame and adapted to lie on opposite sides of the tooth to be filed, one of said gage-plates having a screw in connection therewith, and a thumb-nut working on the screw and revolubly mounted on the frame.

3. A saw-filing gage, comprising a frame, slides mounted on the frame and engaging the saw-teeth to hold the frame on the saw, said slides being adjustable parallel with the edge of the saw toward and from each other, and a gage carried on the frame and adapted to lie against the tooth to be filed.

4. A saw-filing gage, comprising a frame, slides mounted on the frame and engaging the saw-teeth to hold the frame on the saw, said slides being adjustable parallel with the edge of the saw toward and from each other, and a gage carried on the frame and adapted to lie against the tooth to be filed, said gage being situated between the said slides for engaging the saw.

5. A saw-filing gage, comprising a frame having guides thereon, a slide mounted in each guide to move therein toward and from each other parallel with the edge of the saw, said slides being adapted to engage the saw-teeth to hold the frame on the saw, a gage carried on the frame and adapted to lie against the tooth to be filed, and means for adjustably clamping the slides to the guides.

6. A saw-filing gage, comprising a frame having guides thereon, a slide mounted in each guide and adjustable toward and from each other, said slides being adapted to engage the saw-teeth to hold the frame on the saw, a gage-plate carried on the frame and adapted to lie against the teeth to be filed, the said slides comprising each a body, and a downwardly-extended point adapted to engage the drag-teeth of the saw.

7. A saw-filing gage, comprising a frame adapted to be placed on the saw, a gage carried permanently thereon and adapted to lie at one side of the saw-tooth, a second gage lying opposite the first-named gage and at the other side of the saw-tooth, and means for adjustably mounting the second gage on the frame to move crosswise of the saw toward and from the point of the tooth thereof.

In testimony whereof I have signed my name to this specification in the presence of two subscribing witnesses.

SAMUEL JAY GALLOWAY.

Witnesses:
JOHN M. WALL,
EVA WEATHERRED.